HELIUM HEAT RECTIFIER

Filed April 22, 1957 3 Sheets-Sheet 1

CHARLES DARBY FULTON JR.
WILLIAM M. FAIRBANK
INVENTORS

BY David Rabin
ATTORNEY

CHARLES DARBY FULTON JR.
WILLIAM M. FAIRBANK
INVENTORS

BY David Rabin
ATTORNEY

CHARLES DARBY FULTON JR.
WILLIAM M. FAIRBANK
INVENTORS

BY David Rabin

ATTORNEY

United States Patent Office 3,004,394

Patented Oct. 17, 1961

3,004,394
HELIUM HEAT RECTIFIER

Charles Darby Fulton, Jr., Nashville, Tenn. (440 Beechtree Drive, Cincinnati 24, Ohio), and William M. Fairbank, Durham, N.C. (141 E. Floresta, Menlo Park, Calif.)

Filed Apr. 22, 1957, Ser. No. 654,405
18 Claims. (Cl. 62—3)

This invention relates to heat switches for low temperature apparatus and relates more particularly to a means for producing and maintaining low temperatures and comprises a uni-directional heat conductor or heat rectifier that will conduct heat when a temperature difference is provided in a single direction and will not conduct heat when the temperature difference is applied in a reverse direction.

Study and research into the phenomena that occur at temperatures lying below 1 degree Kelvin are still greatly hindered by the difficulties encountered in preforming experiments and maintaining these low temperatures. The principal approach to this field of low temperature research has been made with one-step or non-cyclic magnetic cooling; however, it is very difficult to sustain these low temperatures by this means because of fluid leaks and heat leaks which must be expunged and the necessity for the use of high-vacuum pumping equipment and powerful magnets. In addition, the process is extremely slow and tedious because gas must be pumped away prior to demagnetizing and during the observation period while data are being tabulated the temperature variations are extremely large and the operation is usually interrupted due to rewarming. Therefore, the scope and accuracy of the research are limited by continuously changing temperatures and the inability to extract much heat.

It is to overcome many of the difficulties that investigators have been attempting to contrive and perfect a cyclically operating magnetic refrigerator yielding an ultra low temperature steadily in spite of heat inflow. By means of such a refrigerator with the use of the thermal valve new cooling processes reaching into the microdegree range are possible, and the use of smaller magnets for multistaging is permitted. Furthermore, the ultra low temperatures attained may be sustained indefinitely with the elimination of most or all manipulation and gas purging.

The heat pump of the refrigerator is a mass of paramagnetic salt caused to grow regularly warm and cool by the pulsations of the magnet. The salt has been connected to a liquid helium bath by one controllable heat conductor and to a refrigerated body by a second controllable heat conductor, these devices being so manipulated as to permit heat to flow at the proper times in the cycle. Although superconducting heat switches have been the most successful to date to achieve the ultra low temperatures in a magnetic refrigerator, they are expensive, complicated and necessitate frequent manipulation and auxiliary equipment.

Therefore, it is an object of this invention to provide a simple thermal valve that will conduct heat unidirectionally.

Another objective of this inventive concept is to provide an automatic uni-directional heat rectifier that will conduct heat in but a single direction when a temperature difference exists between two spaced apart positions.

Still another object of this invention is the provision of a heat switch requiring no manipulation and one that possesses an inherently uni-directional heat conductance.

A further object of this invention is the provision of a thermal valve for uni-directional heat conductance for applications in combination with cryogenic apparatus.

Yet another objective of this invention is the provision of a thermal switch in which a mixture of helium isotopes 3 and 4 is retained within a chamber of prescribed volume which volume will be occupied by the helium mixture at operating temperatures below 2 degrees Kelvin.

Another object of this invention is to provide a heat rectifier for one-step magnetic cooling.

Yet still a further object of this invention is the provision of a composition which will permit the flow of heat uni-directionally.

Still other objects of this invention are to provide inexpensive thermal switch that requires a minimum of maintenance and one that is simple in construction and automatic in operation without moving components.

Other objects and many of the attendant advantages of this novel helium heat rectifier will become more readily apparent for the following detailed description taken in conjunction with the accompanying drawings in which like characters of reference designate corresponding parts throughout the several views, and wherein.

Figure 1:
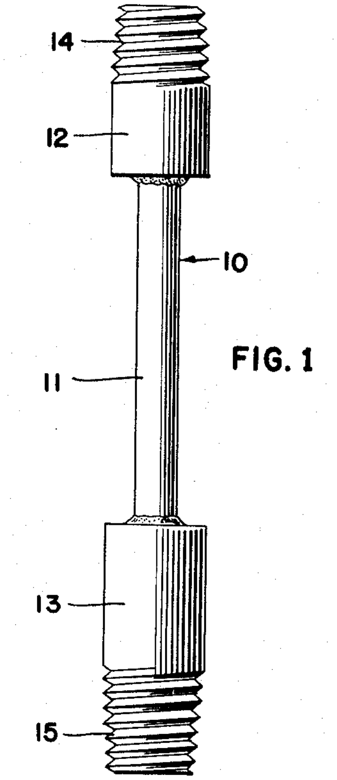
FIG. 1 is an elevational view of a heat rectifier embodying one concept of the present invention.
Figure 2:
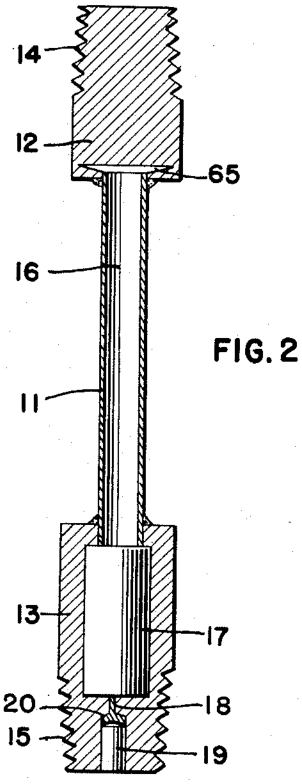
FIG. 2 is a longitudinal sectional view of FIG. 1.

Referring to the drawings and particularly to FIGS. 1 and 2, there is illustrated therein one embodiment of the inventive concept of a thermal valve, heat rectifier or automatic heat switch 10 in which a tubular central member 11, preferably constructed of a relatively poor conductor, such as stainless steel, is fastened securely, as by welding or other suitable means, at the ends thereof to terminal connecting heads 12 and 13 that are fabricated of relatively good conducting material, such as copper, which heads are provided with threaded ends 14 and 15, to form a leak-proof cylindrical chamber 16 within the tubular member 11. Connecting head 13 is provided with an auxiliary chamber 17 within which a suitable charge of a mixture of helium isotopes 3 and 4 may be injected to fill the chambers 16 and 17 by passing through the enlarged passageway 19 and the constricted passageway 18 which passageways communicate with the chamber 17. A suitable fusible plug 20 made of Wood's metal, solder or other suitable material is placed in the end of passageway 19 in order to seal the rectifier after it is properly charged, which charging procedure will be described hereinafter. The volume of helium mixture contained in the chambers 16 and 17 for optimum results must be sufficient to fill the chambers completely with liquid helium at operating temperatures below 2 degrees Kelvin. Once filled with the helium mixture the thermal valve is prepared for application to a suitable cryogenic apparatus for conducting low temperature experimentation and one embodiment of a cryogenic apparatus will be described hereinafter.

The phenomenon discerned in the application of the heat rectifier in which the chambers have been charged with a mixture of helium, when applied in the environment of a cryogenic apparatus, is that heat conduction will be uni-directional. When the head member 12 is warmer than head member 13, heat will be conducted rapidly in the direction from head member 12 to head member 13 due to a certain action of the liquid helium mixture within chambers 16 and 17. However, when head member 13 is warmer than head member 12, very little heat will be conducted vertically upward, that is, from head member 13 to head member 12, because of a disproportionately different action of the liquid helium mixture. Therefore, the thermal valve 10 will conduct heat vertically downwardly but not vertically upwardly.

The basic reasons for the two different actions of the liquid helium mixture are as follows: pure liquid helium 4 below 2.186 degrees Kelvin, is the most powerful heat conductor known, possessing a heat conductivity greatly exceeding that of copper and silver. Were chambers 16 and 17 filled with pure helium 4, the thermal valve would conduct powerfully in both directions and would not act as a rectifier. A commonly accepted theory for the great heat conductivity of helium 4 is that, below 2.186 degrees Kelvin, its atoms divide into different physical states called the normal fluid and the super-fluid. These fluids are soluble in each other and so the liquid remains homogeneous. The colder the liquid helium, the greater is the amount of super-fluid and less is the amount of normal fluid. When a temperature difference exists in the liquid, there is more normal fluid at the warm end than there is at the cold end, and therefore, some of the normal fluid flows from the warm end to the cold end, where the normal fluid changes into superfluid and then returns to the warm end. Therefore, continuous currents of normal fluid and superfluid flow in opposite directions. Since the superfluid has virtually no viscosity the countercurrent flows occurs with little mutual resistance, and therefore, the velocity of the flows is large and there is a rapid transfer of heat from the warm end to the cold end.

If now helium 3 is added to the helium 4, the helium 3 is caught and swept to the cold end by the current of normal fluid flowing toward the cold end. This characteristic is called "the heat flush effect." The countercurrent superfluid has little or no tendency to sweep the helium 3 toward the warm end. Thus, as illustrated in FIG. 2, helium 3 within the helium mixture contained in the chamber 16 will be swept down into the lower auxiliary chamber 17 and substantially removed from the path of the normal fluid, that is, from the path of the heat current, with the result that heat is conducted downwardly readily in the rectifier. However, upon reversing the temperature difference, heat is caused to flow upwardly and the helium 3 is swept up into the top of the chamber 16 where is cannot escape from the path of the heat current, and therefore, because of its very low heat conductivity and its interference with the flow of normal fluid, it acts as a barrier to block the flow of heat upwardly.

Figure 3:
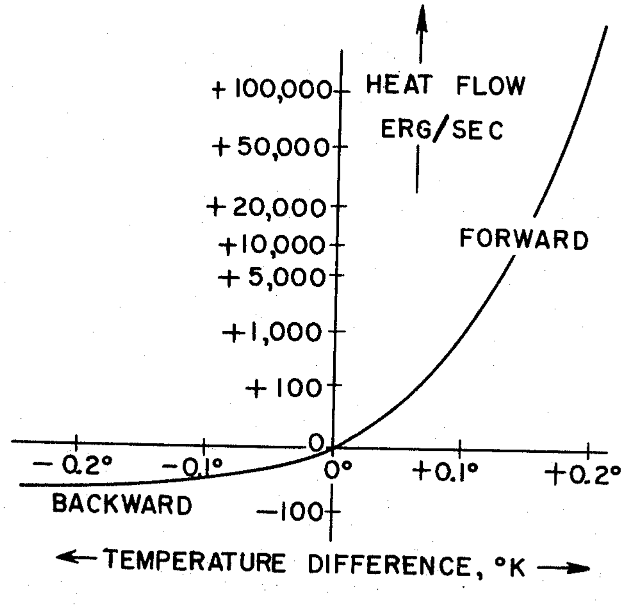
FIG. 3 is a graphical presentation of the rate of heat flow exhibited by a rectifier plotted as a function of forward and backward temperature difference of one rectifier.

In FIG. 3, there is illustrated by graphical representation the approximate amount of heat conducted by a rectifier as a function of forward and backward temperature differences applied to the rectifier. With sufficient temperature differences, the amount of heat conducted may be many thousands of times greater in one direction than in the other direction.

Therefore, helium 4 serves both as a carrier of heat and the motive agent causing a displacement of the helium 3. Helium 3 acts as an obstructive agent or barrier which, if lodged in the heat path, restricts the flow of heat, but which, if removed or diffused, permits heat to flow readily.

It has been found that the quantity of helium 3 employed in the helium mixture will be a matter to be determined to suit the operating conditions and requirements. For use in connection with magnetic cooling (to be described hereinafter) it has been found that a very small quantity of helium 3, less than one percent and in some cases less than one-tenth of one percent, yields the best results in the operating range of 1 degree Kelvin.

In the embodiment illustrated in FIGS. 1 and 2 the chambers 16 and 17 when filled with the helium mixture may develop a pressure as high as 13,000 pounds per square inch at room temperature. The quantity of helium mixture to be contained within chambers 16 and 17 must be sufficient to fill it completely with liquid helium at the operating temperatures below 2 degrees Kelvin. In order to provide sufficient helium to fill the chamber at the low operating temperature, it may be necessary to charge the chambers with a pressure as high as 13,000 pounds per square inch at room temperature. Such a pressure is readily resisted by the small metal components provided they are made of reasonable thickness and exhibit suitable strength characteristics.

For general applications, it is desirable to seal the helium mixture permanently within the rectifier. One procedure for charging a rectifier with the helium mixture is to provide a capillary in the rectifier and to immerse the rectifier within liquid helium and to admit the mixture until the rectifier is full after which the capillary may be sealed. Since liquid helium shrinks approximately 13 percent when it is cooled from 4.2 degrees Kelvin to below 2 degrees Kelvin, a rectifier filled and sealed at 4.2 degrees Kelvin would not be full when cooled to operating temperatures below 2 degrees Kelvin. It is, therefore, necessary that the liquid helium in which the rectifier is immersed be cooled to 2 degrees Kelvin or below before the capillary is sealed.

A procedure of filling and selling a rectifier at room temperature is to provide a capillary communicating with the chamber in which the helium mixture is to be admitted and to attach this capillary to a high-pressure source of the helium mixture at room temperature. The helium mixture is then admitted to the chamber through the capillary, and finally, the capillary is pinched and sealed. In the previously discussed procedures for filling a chamber the capillary will normally project from the rectifier, although the capillary can be secured and concealed if desired.

A procedure which eliminates a capillary is illustrated in FIG. 2 wherein the head member 13 may be attached by means of the threaded connection 15 to a high-pressure source of the helium mixture which may be admitted through the passageway 19 and through the constricted passageway 18 into the chambers 16 and 17. The fusible plug 20 between passageways 18 and 19 may be heated through the head member 13 to such a temperature as will fuse the plug and upon cooling, the plug will seal the passageway 18 after which the rectifier may be detached from the source of helium.

Obviously numerous other procedures for admitting and sealing the rectifier will be apparent to those skilled in the art to which this invention pertains.

It is also possible to introduce the helium mixture of isotopes 3 and 4 into a rectifier during operation of the cryogenic apparatus by providing a capillary tube that may be attached to a convenient location on the rectifier which capillary tube may be connected also to a source of helium remotely located from the cryostat. Such an arrangement may possess advantages over a sealed rectifier in that modifications may be made to the proportions of the helium mixture during the course of an experiment. It is advisable to attach a capillary tube to the rectifier at a convenient location, provided however, the helium 3 will be permitted to concentrate at a location in the rectifier to serve as an insulating barrier without being vacated from the rectifier. That is, it is advisable to attach a capillary tube at a point which will not permit the helium 3 to escape or return into the capillary tube.

There are three identifiable ways in which helium 3 may be caused to distribute itself so as to produce a flow of heat that is large or small according to the direction of the heat flow. These three methods are as follows:

(1) Spreading, or conversely packing which is produced by a change in the cross-sectional area of a chamber;

(2) Shunting or by-passing by causing the helium 3 to flow into a secluded chamber or reservoir; and (3) Gravitational convection which is attributed to the fact that liquid helium isotope 3 is approximately half as dense as liquid helium isotope 4.

Figure 4:
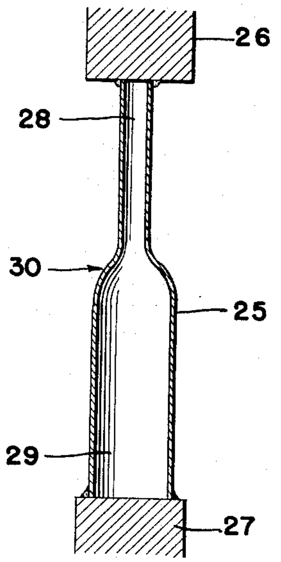
FIG. 4 is a longitudinal sectional view illustrating a modified embodiment of the inventive concept in which a difference in tubular diameter is employed.

In FIG. 4 the spreading or packing method is illustrated wherein the leakproof chamber 25, having attached conductor head members 26 and 27 at the ends thereof, has an upper constricted section 28 and a lower enlarged section 29 with a downwardly diverging intermediate portion 30. When heat flows downwardy, the helium 3 is flushed into the enlarged section 29, which not only spreads the helium 3 over a large cross-sectional area but forms it into a thin layer, resulting in a large heat flow. When heat flows upwardly, the helium 3 is packed into a long, narrow mass in the upper constricted section 28 and heat flow is thus inhibited. To a first approximation, the ratio of the downward conductivity to the upper conductivity, in the embodiment illustrated in FIG. 4, is equal to the fourth power of the ratio of the diameter at section 29 to the diameter at the section 28, and is equal to about approximately 100 in FIG. 4. Obviously many modifications may be made in the contour of the upper and lower sections of the chamber 25 to provide a spreading or packing effect.

Figure 5:
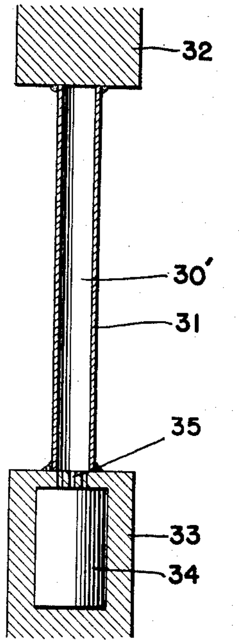
FIG. 5 is a longitudinal sectional view of another modification of the invention in the form of a shunting or a remote reservoir.

An embodiment illustrating the principle of shunting or by-passing is shown in FIG. 5 wherein the chamber 30′, formed by the tubular housing 31, reaches between a solid conductor head member 32 to the head member 33. Head member 33 is provided with a reservoir 34 which reservoir communicates with the chamber 30 through the passageway 35 leading from the head member 33 into the chamber 30′. When heat flows downwardly, a high concentration of helium 3 is momentarily produced just above the passageway 35, which may be in the form of a small opening or a series of openings, leading into the reservoir 34. Because of the rapid molecular diffusion of helium 3, the latter diffuses into the reservoir, thus removing itself from the heat path and allowing a large flow of heat. When heat flows upwardly, the helium 3 diffuses out of the reservoir 34 and proceeds to the upper end of the chamber 30′, thereby restricting the flow of heat. The shunting mechanism is capable of yielding extremely high forward and backward ratios.

Figure 6:
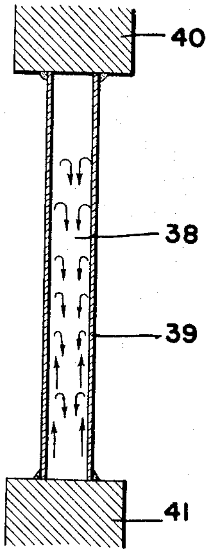
FIG. 6 is a longitudinal sectional view of a gravitational convection rectifier.

The gravitational convection principle is illustrated in the application shown in FIG. 6 which convection arises from the fact that liquid helium 3 is about half as dense as liquid helium 4. The helium mixture is contained within chamber 38 within the tubular member 39 which member is provided with conductor heads 40 and 41 to seal the ends of the member. When heat flows downwardly, a concentration of light liquid is built up at the bottom of the tubular chamber, whereupon the buoyancy of this concentrate causes it to float back up either in the form of pulsating slugs or globules (not shown) or in the form of a smoothly flowing layer adjacent to the tubular wall, as illustrated by the directional arrows. The concentrate floating upwardly in this manner then diffuses into and is entrained by the downward-flowing normal fluid and is heat-flushed again to the bottom of the tubular member. The helium 3 thus engages in a pulsating or steady circuital flow that keeps it from inhibiting the flow of normal fluid by standing stationary in the path of the latter. The result is a large heat flow. When heat flows upwardly, the light concentrate remains stable at the top of the tubular member and thus restricts the flow of heat.

In the preferred embodiment illustrated in FIG. 2, all three principles are employed. Because of the possibility of convection, the embodiments illustrated in FIGS. 2, 4, 5 and 6 are unsuitable for upside-down operation, primarily because the helium 3 might fail to remain quiescent in the then lower end of the chamber, thereby destroying the insulating effect.

Figure 7:
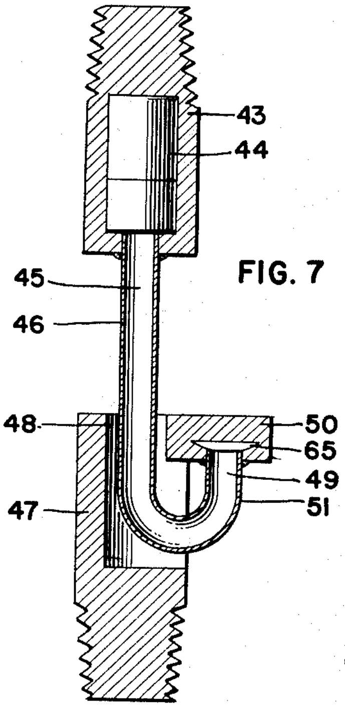
FIG. 7 is a longitudinal sectional view of a further modification of a thermal rectifier for upward conduction and downward insulation.

There is illustrated in FIG. 7 a rectifier capable of upside-down operation, that is, for upward conduction and downward insulation. Conducting head member 43 is provided with a ballast volume cavity 44 into which cavity the chamber 45, formed by the return-bend tube 46, communicates. The lower conducting head member 47 is provided with an opening 48 to receive the lower end of the tube and the return-bend 49 in the tube 46 without having the head member contacting the lower end of the tube. A projection 50 extending from the head member 47 will seal the upper level of the return-bend which forms the vertical leg 51. Vertical leg 51 provides a reservoir and may be located at a level intermediate the height of the main chamber 45. In this embodiment, when heat flows downwardly, the helium 3 will be flushed around the bend 49 and held in the uppermost portion of the vertical leg 51 by the combined effects of heat flush and buoyancy, thus resulting in the desirable heat insulation.

It will be readily apparent that various combinations may be employed to achieve optimum results by taking advantage of the effects of shunting or the reverse, spreading or the reverse, or gravitational convection or the reverse, as well as the utilization of a combination of these effects by proper proportioning of the helium mixture and the shaping of the components, as well as a selection of the proper materials with respect to conductivity and nonconductivity, so as to produce a rectifier that conducts selectively upwardly, downwardly, horizontally, or at any desirerable angle.

As previously stated the helium mixture contained within a sealed chamber may develop a pressure as high as 13,000 pounds per square inch at room temperature and in order to reduce the high pressure it is possible to provide a supplementary or ballast volume into which the helium mixture may expand. Such a volume may consist of an extensible bellows or other variable volume means or mechanism employed in conjunction with a rectifier or it may consist of a fixed cavity integrally incorporated into a rectifier. This ballast volume is preferably located higher than the highest point that is to to contain the liquid helium mixture and should be attached at some point other than that where the helium 3 concentrates to form the insulating barrier. It is also desirable that the ballast volume should be thermally connected to a head piece from which heat is to be conducted away.

Figure 8:
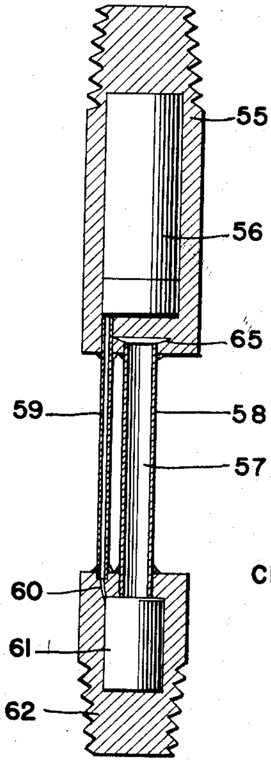
FIG. 8 is a longitudinal sectional view of another modification of a heat rectifier in combination with a ballast volume.

One embodiment incorporating this ballast volume principle is shown in FIG. 8 wherein the head member 55 is provided with a cavity 56 whose volume in one form is approximately four times larger than the volume of the chamber 57 that is formed within tube 58 for containing the liquid mixture. Therefore, a pressure of ⅕ of 13,000 pounds per square inch or 2600 pounds per square inch, will be required at room temperature. A conduit 59 communicates with the cavity 56 to conduct fluid through the passageway 60 into the cavity 61 within the lower head member 62 which cavity 61 communicates with the chamber 57. During operation of the cryogenic apparatus, when head member 55 is warmed, the liquid will not be driven out of the top of chamber 57 by the increased vapor pressure resulting from the warming, because an opposing vapor pressure is created in the ballast volume or cavity 56. In the event the volume 56 were not thermally connected to head member 55, this opposing vapor pressure would not be generated and the liquid would be driven downwardly thereby causing the rectifier to fail to conduct.

The upwardly-conducting rectifier illustrated in FIG. 7 also lends itself conveniently to the use of the ballast volume, which in the case of the embodiment illustrated consists of a direct extension of the chamber 45 for communication with the volume 44 in the head member 43. In FIG. 7, the chamber 44 need not be entirely full of the liquid helium. However, when heat is supplied at the reservoir 51, no opposing vapor pressure comes into play to hold the liquid in the reservoir so that the liquid can easily be driven out of the reservoir 51, causing the rectifier to fail to conduct. Only the static head of the column of liquid in the rectifier is available to oppose the vapor pressure at 51. For this reason, it will be readily apparent that it will be desirable to make the rectifier tube 45 in the vertical reach quite long.

In FIGS. 2, 7 and 8 there is shown a small frusto-conical chamber 65 that communicates with the chambers of the respective enclosures for containing the mixture of helium. The purpose of this chamber is to provide a large surface area between the metal and the liquid helium so that heat can flow readily from the former to the latter when the rectifier is conducting. It is well known that there is a surface resistance between liquid helium and any solid wall at low temperatures, this being called the "Kapitza resistance" and "Kapitza film." This resistance is in series with the rectifier and it should be minimized in order that the rectifier will be able to conduct a large amount of heat at the proper times. Chamber 65 which may be called a "Kapitza chamber," should have a large surface area but a small volume. Other means of overcoming Kapitza resistance, known to those skilled in this low temperature art include: the use of copper fins or wool, porous copper, grooves, scratching the surface within the chamber, and etching the surface.

At the ultra low temperature below about one-half degree Kelvin, certain changes in the physics underlying the operation of the rectifier occur. One such change is that helium 4 ceases to be a good conductor because the normal fluid vanishes. Another is that the addition of helium 3 causes the normal fluid to reappear. Still another is that the two heliums, that is, helium isotopes 3 and 4, begin to become insoluble in each other and the mixture separates into two liquids having different compositions. It will, therefore, be apparent that certain adaptions should be made in the design of a rectifier intended for use at these ultra low temperatures.

It will be readily apparent that in the various descriptions of chambers in this specification wherein the term "tubular" has been employed, this term shall not be construed in any limitative sense or restricted to a cylindrical configuration, but shall include the configurations or shapes of any container for supporting a column of helium whether the cross-sectional area takes any of the known geometrical shapes.

Figure 9:
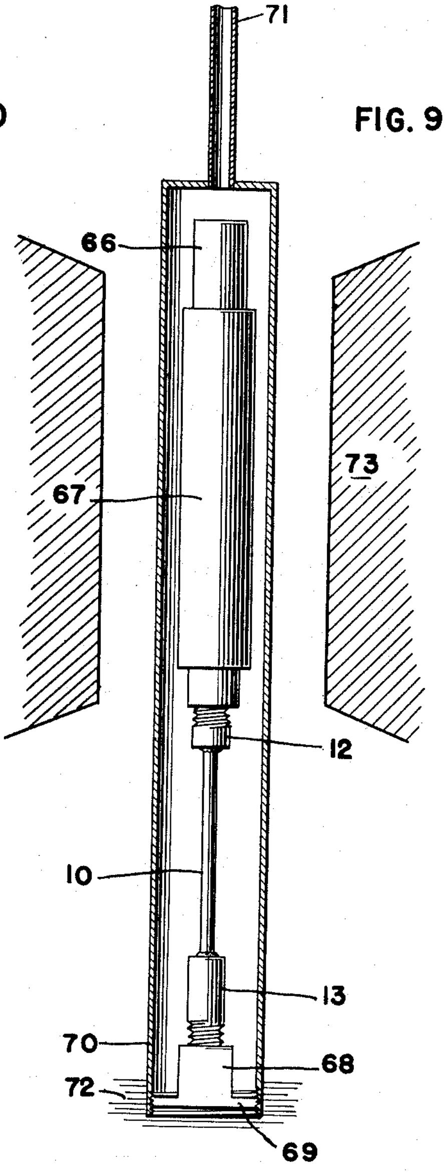
Fig. 9 is an elevational view, partially in section and schematic diagram, of an apparatus for ultra-low-temperature experimentation utilizing a rectifier of the invention.

In FIG. 9 there is shown a cryogenic apparatus designed for ultra low temperature determinations for use in combination with the heat rectifier of this invention. A research sample consisting of matter, the behavior of which is to be investigated at temperatures below 1 degree Kelvin is placed within an enclosure 66 and the enclosure 66 is supported on or associated in some suitable manner on the container 67 which latter container is filled with a paramagnetic salt. In turn, the container 67 having the paramagnetic salt therein, is attached to the head end 12 of a thermal valve 10, such as disclosed above in FIGS. 1 and 2, the lower head member 13 may be threadably connected to the coupling 68 which coupling and flange 69 may be removed from one end of the housing 70. The housing 70 encloses the sample to be investigated, the container together with the paramagnetic salt and the thermal valve. The interior of the housing 70 may be evacuated through the passageway 71 in order to insulate the contents within the housing. Initially, the rectifier 10 will cool the container enclosing the paramagnetic salt together wtih the sample within the enclosure 66 to the temperature of a surrounding liquid helium bath 72 which envelops the housing. Electromagnet 73 may be switched on thereby causing the paramagnetic salt together with its container 67 to grow warm, whereupon the rectifier 10 will conduct heat from the salt and the container 67 until the latter are once again at the temperature of the surrounding bath 72. Electromagnet 73 is then switched off, whereupon the paramagnetic salt and its container 67 together with the sample being investigated are cooled to an ultra low temperature and remain at this temperature for an extended duration due to the insulating characteristics of the rectifier 10. The containers 66 and 67 may be recooled quickly and easily at anytime by remagnetizing and demagnetizing without time consuming manipulations of the apparatus.

Figure 10:
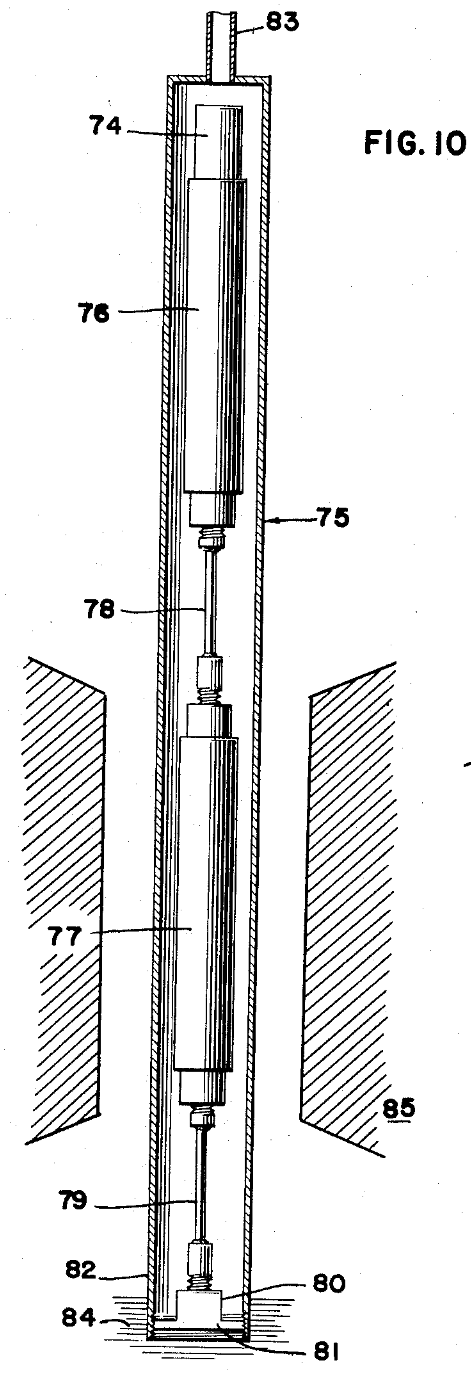
FIG. 10 is an elevational view, partially in section and schematic diagram, of a cyclic magnetic cooling apparatus utilizing a heat rectifier of this invention.

In the magnetic refrigerator or cyclic magnetic cooling apparatus 75 shown in FIG. 10, the two vertically spaced cylindrical containers 76 and 77 hold paramagnetic salt and the enclosure 74 has a sample of matter, the characteristics of which are to be determined during the low temperature experiment. A rectifier 78, similar to that described in FIGS. 1 and 2, thermally connects containers 76 and 77 together while the rectifier 79 connects the container 77 to the coupling 80 on the removal end cap 81 that seals the lower end of the housing 82 in which the components are contained. Evacuation of the interior of the housing 82 is effected through the passageway 83 at the top of the housing. Housing 82 is immersed in a liquid helium bath 84. Electromagnet 85 when switched on, causes container 77 to grow warm, whereupon rectifier 79 conducts heat and recools container 77 to the temperature of the helium bath 84. Meanwhile the rectifier 78 insulates container 76. The electromagnet 85 is then switched off, causing container 77 to grow cold whereupon rectifier 78 cools container 76 by conducting heat from container 76 to container 77 while the rectifier 79 insulates container 77. The electromagnet 85 is now switched on again and the cycle is repeated thereby cooling container 76 further. As the cycles are successively repeated by switching electromagnet 85 on and off, container 76 is successively and automatically cooled to lower and lower temperatures. The result is virtually continuous refrigeration of container 76 and of any sample of matter that is contained within the enclosure that may be attached thereto.

Since the rectifier does not conduct heat appreciably at high temperatures, it is necessary to employ some auxiliary means for cooling containers 67, 76 and 77 from room temperature to a few degrees Kelvin, where the rectifier becomes active if the helium baths 72 and 84 are well below 2.186 degrees Kelvin. A common method of accomplishing such precooling is to admit helium gas to the interior of the housings 70 and 82 and then to evacuate the helium gas when precooling is accomplished. Obviously, this process is slow and tedious. Therefore, by employing one of the superconducting metals, that is, as a structural link between the containers 67, 76 and 77 and the respective housings 70 and 82, such that the super-conducting material will conduct heat readily at the higher temperature to effect a precooling, the superconducting material will cease to conduct at the low temperatures, thereby allowing the rectifier to operate without being thermally short-circuited. As an alternate to the use of the non-conducting material employed for the chambers, it is proposed to utilize one of the superconducting metals or alloys as the material from which the primary conducting tube of the rectifier may be made, or as a structural member that is in parallel with the tubular member to reach between and connect the head members.

Thus there has been described a novel composition of matter in the form of a mixture of helium isotopes 3 and 4 which when maintained at a prescribed temperature will accomplish heat conductance uni-directionally; also, a thermal valve has been described in which to accomplish the conductance of heat flow uni-directionally either in a downward direction or in an upward direction; and a cryogenic apparatus has been described in which a single heat rectifier or a series of heat rectifiers may be utilized to achieve ultra low temperatures.

Obviously, many modifications and variations may be made in the construction and arrangements of the chambers as well as the head members as well as the configuration of the chambers, and the proportions of the helium isotopes 3 and 4 within the helium mixture as well as the other phases of the present inventive concept in the light of the above teachings without departing from the real spirit and purpose of this invention. Such modifications of parts and alternatives as well as the use of mechanical equivalents to those herein illustrated and described are reasonably included and modifications are contemplated.

What is claimed is:

1. A thermal value of the character described comprising a sealed chamber and a liquid mixture of helium isotopes 3 and 4 comprising between less than one percent and one-tenth of one percent of helium 3 in said chamber.

2. A thermal valve of the character described comprising a sealed chamber, closure means communicating with said chamber, and a liquid mixture of helium isotopes 3 and 4 comprising between less than one percent and one-tenth of one percent of helium 3 in said chamber.

3. A thermal valve of the character described comprising a sealed container, a liquid mixture of helium isotopes 3 and 4 comprising between less than one percent and one-tenth of one percent of helium 3 within said container whereby at low temperatures said helium mixture conducts heat uni-directionally.

4. An automatic thermal switch of the character described comprising a tubular chamber, the ends of said chamber being sealed, a reservoir communicating with said chamber, and a liquid mixture of helium isotopes 3 and 4 comprising between less than one percent and one-tenth of one percent helium 3 in said tubular chamber and reservoir for uni-directional heat conductance.

5. An automatic thermal switch for cryogenic apparatus comprising a sealed chamber, means for connecting said chamber to a cryogenic apparatus, and a mixture of liquid helium isotopes 3 and 4 comprising between less than one percent and one-tenth of one percent of helium 3 in said chamber for accomplishing uni-directional heat conductance.

6. An automatic heat switch of the character described having a tubular chamber, said chamber having at least two different cross-sectional areas in spaced axial relation to each other, and a mixture of liquid helium isotopes 3 and 4 comprising between less than one percent and one-tenth of one percent of helium 3 sealed in said chamber to conduct heat uni-directionally.

7. An automatic heat switch of the character described having a chamber, said chamber having at least two different cross-sectional areas in spaced axial relation to each other, a mixture of helium isotopes 3 and 4 comprising between less than one percent and one-tenth of one percent of helium 3 sealed in said chamber to conduct heat uni-directionally, and means for connecting said chamber to a cryogenic apparatus.

8. An automatic heat rectifier of the character described having a tubular chamber, said chamber having at least one enlarged section and one reduced section, said sections communicating with each other and being in spaced axial relation, and a mixture of helium isotopes 3 and 4 comprising between less than one percent and one-tenth of one percent of helium 3 sealed in said chamber to conduct heat uni-directionally.

9. An upward heat conducting rectifier of the character described comprising a tubular chamber, said chamber having a return-bend therein, cryogenic connecting and chamber sealing means on the terminal ends of said chamber, and a mixture of helium isotopes 3 and 4 comprising between less than one percent and one-tenth of one percent of helium 3 in said chamber.

10. An upward heat conducting thermal valve of the character described comprising a tubular sealed chamber, said chamber comprising a first vertical leg and a second vertical leg in spaced lateral relation parallel to each other, said second vertical leg being foreshortened relative to said first vertical leg, said second vertical leg communicating with said first leg at the lower extremities of each, a reservoir communicating with the first vertical leg at the top extremity thereof, and a mixture of helium isotopes 3 and 4 comprising between less than one percent and one-tenth of one percent of helium 3 in said chamber and reservoir.

11. A thermal valve of the character described comprising a tubular chamber, chamber sealing means at the ends of said chamber, a reservoir in one chamber sealing means communicating with one end of the tubular chamber, a reservoir in the other chamber sealing means, a conduit connecting said reservoirs, and a mixture of helium isotopes 3 and 4 at least in said tubular chamber and in said tubular chamber communicating reservoir.

12. A cryogenic apparatus for low temperature experimentation for analyzing a sample of matter comprising a container having a paramagnetic salt therein, said sample of matter being associated with said container, a thermal valve connected at one end to said container, said thermal valve having liquid helium isotopes 3 and 4 therein to accomplish uni-directional heat conductance, a compartment for housing said sample of matter and container and thermal valve, said thermal valve being connected to one end of said compartment, a helium bath for immersing one end of the compartment, and a magnet operatively associated to surround a container to cool the paramagnetic salt by impressing a magnetic field thereupon.

13. For use in combination with a cryogenic apparatus to examine matter for low temperature experimentation in magnetic cooling apparatus comprising a container having a paramagnetic salt therein, said container and said matter being associated with each other, and a thermal valve connected to said paramagnetic salt container, said thermal valve having helium isotopes 3 and 4 therein to accomplish uni-directional heat conductance.

14. For use in combination with a cryogenic apparatus to examine a sample of matter in which a magnet is employed to sequentially heat a paramagnetic salt within the field of the magnet which salt and said sample to be investigated may be recooled periodically by remagnetizing and demagnetizing, a heat switch connected to said paramagnetic salt thermally to conduct heat therefrom, said heat switch having a sealed cavity, and a mixture of helium isotopes 3 and 4 within said cavity for accomplishing heat conductance uni-directionally.

15. A thermal valve for uni-directional heat conductance upwardly comprising a chamber, said chamber having a vertical portion and a reservoir portion, said reservoir portion communicating with the vertical portion at the lower end thereof, and the reservoir portion reaching to a position intermediate the vertical portion, a conductor head at the top of said chamber vertical portion, a conductor head on the reservoir portion, and a mixture of helium isotopes 3 and 4 in said chamber and reservoir.

16. A thermal valve of the character described comprising an elongated vertical sealed chamber of substantially non-conducting material, a conducting head member at each end of said chamber, and a mixture of helium isotopes 3 and 4 in said chamber.

17. The method of cooling a sample of matter to ultra low temperatures using a magnet and a paramagnetic salt comprising the steps of creating an electrical field to warm the paramagnetic salt, conducting the heat away from the salt uni-directionally along a prescribed confined path through a liquid mixture of helium isotopes 3 and 4, automatically blocking the flow of heat in the reverse direction, restoring the salt to its original temperature, destroying the electrical field created to cool the salt and the sample of matter to a very low temperature at which temperature the salt and sample of matter will remain for an extended duration of time.

18. A cryogenic apparatus of the cyclic magnetic type for reducing the temperature of a sample of matter to ultra low temperatures continuously comprising a housing, a first container having paramagnetic salt therein with which salt the sample of matter may be associated, a second container having paramagnetic salt therein, said containers being spaced from each other, a first thermal valve containing a liquid mixture of helium isotopes 3 and 4 therein communicating with the spaced apart containers to conduct heat uni-directionally from the first container to said second container, a second thermal valve being connected at one end to the second container to conduct heat uni-directionally therefrom, said second thermal valve also communicating with said housing, said containers and thermal valves being enclosed within said housing, a liquid helium bath surrounding said housing, and a magnet for impressing a magnetic field upon the paramagnetic salt within a container whereby the first container will continuously be subjected to the uni-directional cooling of the second container.

References Cited in the file of this patent

UNITED STATES PATENTS

| | | |
|---|---|---|
| 1,517,466 | Schaller et al. | Dec. 2, 1924 |
| 2,207,174 | Jenkins | July 9, 1940 |
| 2,273,960 | Hopkin | Feb. 24, 1942 |

OTHER REFERENCES

The Design and Operation of a Magnetic Refrigerator for Maintaining Temperatures below 1° K. By C. V. Heer, C. B. Barnes and J. G. Daunt in Review of Scientific Instruments, volume 25, No. 11, November 1954, pages 1088–1098.

"Progress in Low Temperature Physics," edited by C. J. Gorter, published in Interscience Publishers, Incorporated, of New York, publication date 1955, volume 1, pages 131, 132, 133 and 134.

"Low-Temperature Physics," Nature, Oct. 23, 1954, vol. 174, pages 770–772, page 771 relied upon.

"Magnetic Cooling" (C. Garrett), published by Harvard University Press (N.Y., John Wiley & Sons, Inc.), 1954, pages 6–8 relied upon.

Physical Review, Second series, published for the American Physical Society by the American Institute of Physics, at Prince & Lemon Streets, Lancaster, Pa., publication date Feb. 1, 1948, volume 73, pages 256 and 257.